March 21, 1961 G. A. BURDICK 2,975,637
LEAK FINDER
Filed Feb. 13, 1957 3 Sheets-Sheet 1
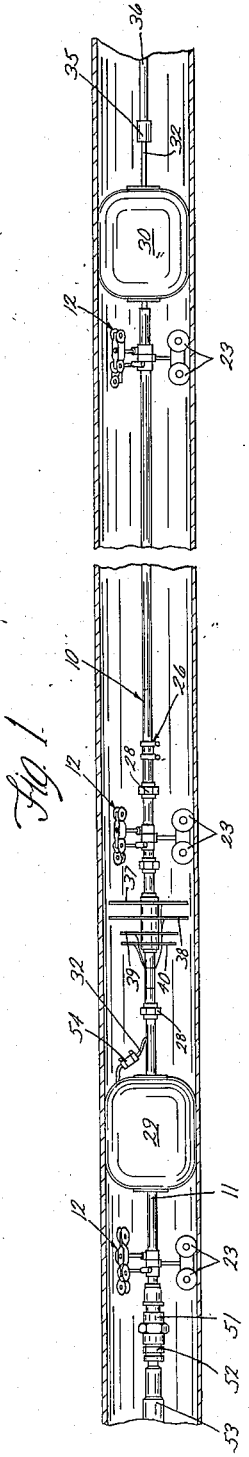
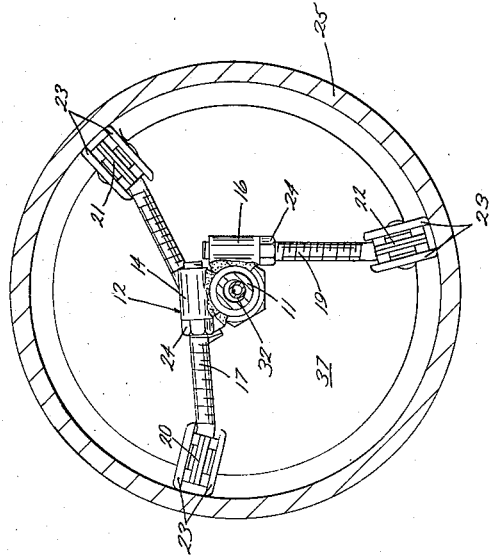
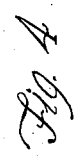
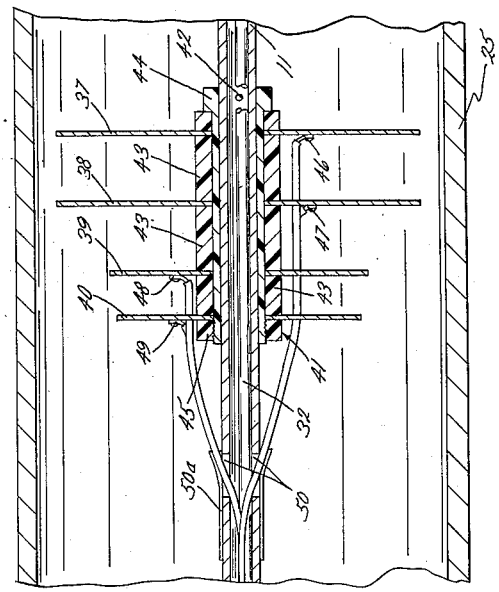
INVENTOR.
Glenn A. Burdick
BY
‎ Atty.

March 21, 1961 G. A. BURDICK 2,975,637
LEAK FINDER

Filed Feb. 13, 1957 3 Sheets-Sheet 2

INVENTOR.
Glenn A. Burdick
BY
Atty.

March 21, 1961 G. A. BURDICK 2,975,637
LEAK FINDER
Filed Feb. 13, 1957 3 Sheets-Sheet 3
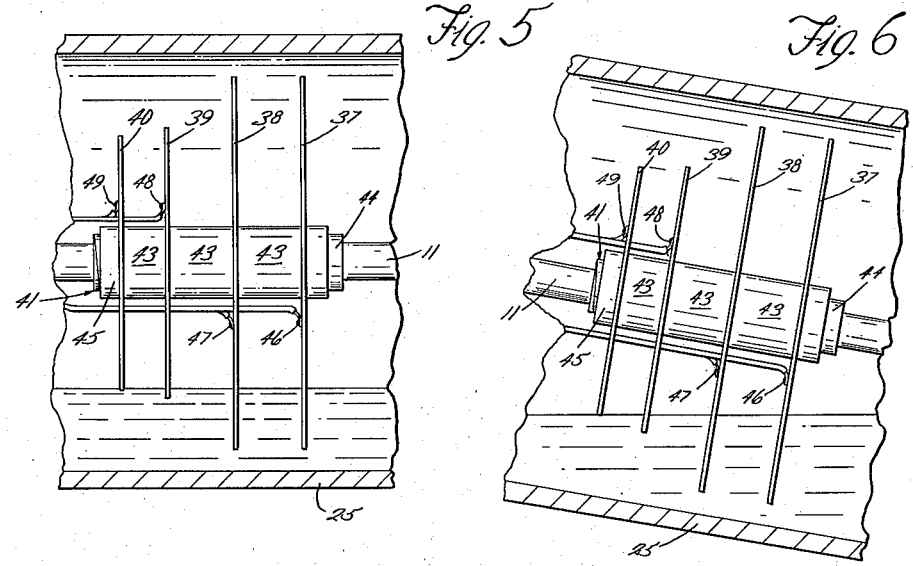
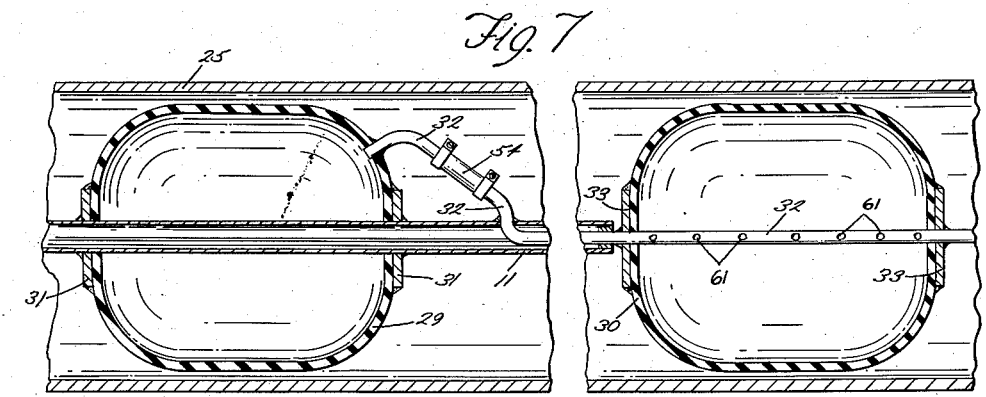
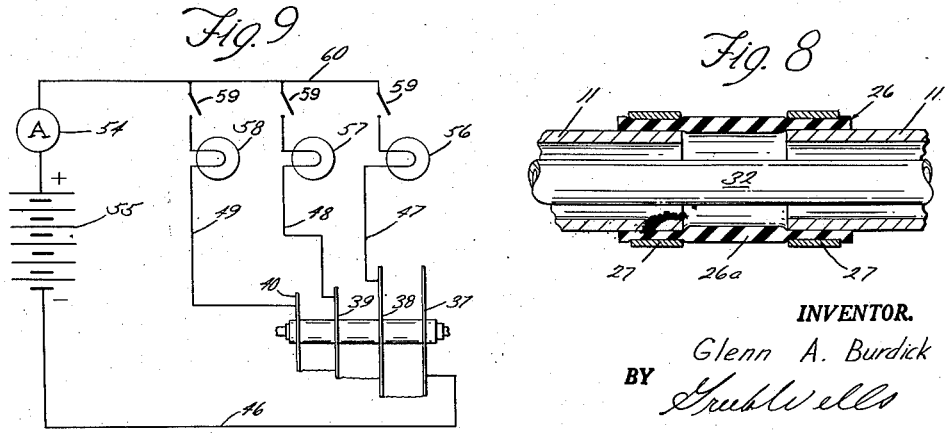
INVENTOR.
Glenn A. Burdick
BY Grubb Wells
Atty.

United States Patent Office 2,975,637
Patented Mar. 21, 1961

2,975,637
LEAK FINDER

Glenn A. Burdick, Murray, Utah, assignor to Statewide Plumbing & Heating Co., Inc., Murray, Utah Filed Feb. 13, 1957, Ser. No. 640,038

12 Claims. (Cl. 73—304)

The present invention relates to improvements in devices for discovering leaks in underground pipes such as sewage pipes and the like, and more particularly to devices for discovering and evaluating the influx of ground water into such pipes.

In the construction and maintenance of underground pipes such as sewage disposal pipes and the like, considerable difficulty is often experienced in areas of ground wherein the sewage pipes are laid below the water table. If, in such areas, defects in the pipe exist, the surrounding ground water is able to infiltrate into the pipes and flow therethrough, seriously diminishing the sewage carrying capacity of the pipes. It is frequently necessary in such areas to investigate the pipes to discover the presence of such defects, and the rate of inflow of ground water therethrough. It is the principal purpose of this invention to provide a device for this purpose which may be passed through a section of underground pipe and utilized to seal off a portion of the pipe to be tested for infiltrating leaks.

A further purpose of my invention is to provide such a device which will not only detect the presence of an infiltrating leak, but which may also be used to measure the rate of infiltration of the water.

The nature and advantages of my invention will appear more clearly from the following description and the accompanying drawings wherein a preferred form of the invention is shown. It should be understood, however, that the drawings and description are illustrative only, and are not intended to limit the invention except insofar as it is limited by the claims.

In the drawings:

Figure 1 is a cross sectional view of a section of sewer pipe showing my invention in place to check a portion thereof for infiltrating leaks;

Figure 3 is a sectional view taken substantially on the line 3—3 of Figure 2;

Figure 4 is a fragmentary cross sectional view of the water detecting and measuring means shown in Figure 2;

Figures 5 and 6 are views similar to Figure 2, but illustrating the manner in which the volume of water entering the pipe section is measured;

Figure 7 is an enlarged fragmentary cross sectional view of the device illustrated in Figure 1, showing the construction of the pipe sealing means;

Figure 8 is an enlarged fragmentary sectional view illustrating the construction of one of the flexible joints of the device; and Figure 9 is a circuit diagram illustrating the water detecting and measuring circuit.

Figure 2:
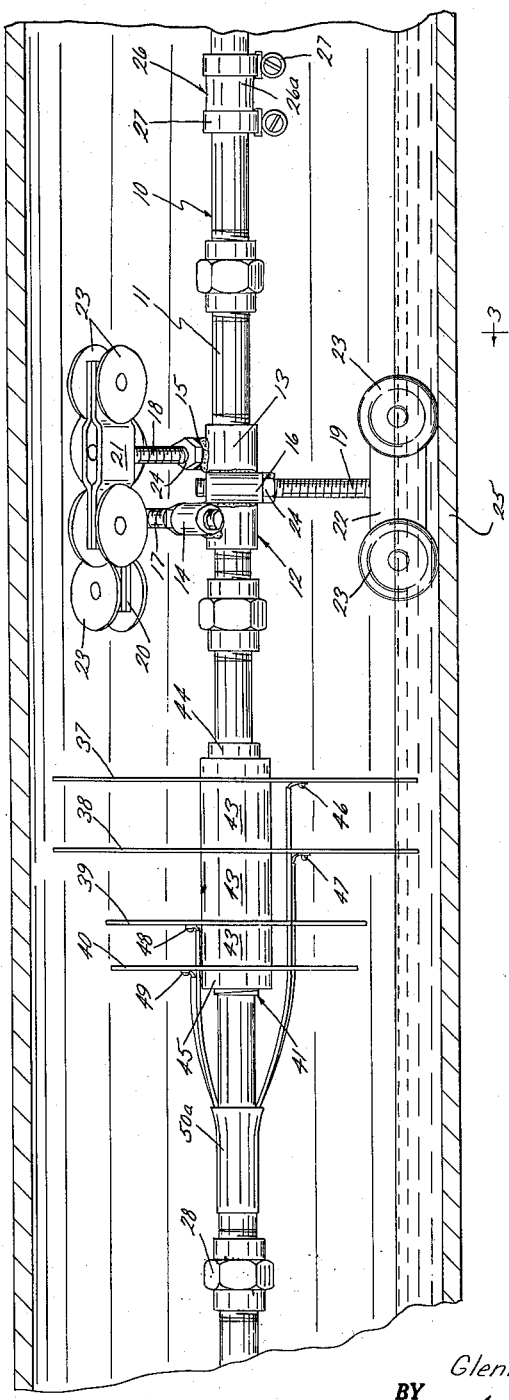
Figure 2 is an enlarged sectional view similar to Figure 1, but showing in greater detail the ground water detecting and measuring means.

Referring now to the drawings, and to Figures 1 and 2 in particular, my invention is shown as embodied in a testing apparatus generally indicated at 10, which comprises a tubular supporting pipe 11 which has thereon at spaced intervals three sets of carrying wheel units generally designated by the numeral 12. As best illustrated in Figures 2 and 3, each of the wheel units 12 comprises a collar 13 which receives the pipe 11 therethrough, and which mounts three tangential internally threaded sleeves 14, 15 and 16. The sleeves 14, 15 and 16 adjustably receive threaded shafts 17, 18 and 19 which extend tangentially outward from the pipe 11 and carry roller frames 20, 21 and 22 thereon. Each of the frames 20, 21 and 22 supports two sets of rollers 23, the rollers 23 being disposed substantially radially of the pipe 11 and at approximately 120 degrees from each other around the pipe 11. Each of the threaded shafts 17, 18 and 19 has a lock nut 24 thereon which may be tightened against the sleeve 14, 15 or 16 to secure the shaft in place. With this construction, the wheel units 12 can be adjusted so that the three sets of rollers 23 of each unit 12 will support the pipe 11 at the center of an underground sewer pipe such as indicated at 25 in the drawings, for free longitudinal movement therein.

In order that the pipe 11 may be free to move easily through successive sections of sewer pipes 25 which may not be exactly aligned with each other, I provide at least one flexible connection 26 therein. As shown in Figure 8, the connection 26 is formed by cutting out a section of the pipe 11 and inserting therein a length of rubber tubing 26a which is fastened in place by clamps 27. This construction allows the pipe 11 to bend as needed, to traverse pipe sections 25 which may be out of line with their neighbors. I also provide at several points in the pipe 11, separable joints such as indicated at 28 whereby to divide the pipe 11 into several portions for easier construction and repair purposes.

It is the purpose of my invention to seal off selected portions of the sewer pipe 25 and test or check these sealed off portions to determine the presence and extent of leaks therein through which ground water may seep into the pipe 25. To seal the sewer pipe 25, I provide a pair of inflatable rubber balls or balloons 29 and 30. As shown in Figures 1 and 8, the balloons 29 and 30 are positioned at the opposite ends of the supporting pipe 11 and are of such a size that while deflated, they may pass through the sewer pipe 25, but when inflated, they will seal off the area of pipe 25 therebetween. The balloon 29 is mounted on the supporting pipe 11 near one end and sealed thereto against washers 31. The balloon 30 is positioned immediately beyond the opposite end of the pipe 11 and is supported upon an air pipe 32 which extends into the pipe 11. The balloon 30 is sealed to the air pipe 32 against washers 33. The air pipe 32 passes through the supporting pipe 11 to a point near the balloon 29, and then passes through the wall of the supporting pipe 11 and thence to the balloon 29 to supply air thereto. A flexible joint 54 is provided in the air pipe 32 as shown best in Figure 7, to permit flexing thereof as the balloon 29 is inflated and deflated. The air pipe 32 is coupled at the end adjacent the balloon 30 as shown at 35, to an air hose 36. The hose 36 extends to a source of air under pressure (not shown) from which air may be admitted to the air pipe 32. Air in the pipe 32 passes through apertures 61 therein inside the balloon 30 and also into the balloon 29 from the end of the pipe 32 to inflate the balloons 29 and 30 when desired to seal a section of pipe 25. The coupling 35 is constructed so as to withstand endwise tension so that the hose 36 may be used to move the apparatus in the sewer pipe 25.

Intermediate the balloons 29 and 30, I provide the water detecting and measuring means by which the presence and extent of a leak in the sealed off portion of the sewer pipe 25 is detected. The detecting and measuring means comprises four spaced apart electrodes in the form of circular disks 37, 38, 39 and 40 carried by the supporting pipe 11. As shown in Figure 4, the disks 37–40 are mounted on an insulating sleeve 41 which is pinned to the pipe 11 by a pin 42. The disks 37–40 are held in spaced relation on the sleeve 41 by insulating spacers 43. The spacers 43 are held between an enlarged head 44 on the sleeve 41 at one end, and a threaded collar 45 at the other end. With this construction, the disks 37–40 are insulated from each other, and from the pipe 11. The disks 37–40 are electrically connected to wires 46, 47, 48 and 49 respectively which pass into the pipe 11 through apertures 50, and thence through the pipe 11 to the end thereof adjacent the balloon 29. The apertures are sealed by wrappings 50a to prevent entrance of water into the pipe 11. At this point, the wires 46–49 are connected to a water proof socket 51 into which a water proof plug 52 is received. The plug 53 is mounted at the end of a four wire electrical cable 53. The plug 52 and socket 51 are coupled together in such a manner as to withstand endwise tension so that the cable 53 may be used to move the apparatus in the sewer pipe 25.

The eletrical cable 53 is connected at its opposite end to a control box (not shown) which has therein an ammeter 54, a battery 55, and three indicator lamps 56, 57 and 58. Figure 9 illustrates the electrical circuit in which these several elements are connected with the disks 37–40. As shown in Figure 9, the right hand disk 37 is connected by the wire 46 to the negative terminal of the battery 55. The disk 38 is connected by the wire 47 to one terminal of the lamp 56. The disk 39 is connected by the wire 48 to one terminal of the lamp 57. The disk 40 is connected by the wire 49 to one terminal of the lamp 58. The second terminals of the lamps 56, 57 and 58 are connected through switches 59 to a line 60 connected to the positive terminal of the battery 55. The ammeter 54 is connected in the line 60. With the circuit thus connected, no lamp can be lighted until a current path is established between the disk to which that lamp is connected, and the disk 37 which is connected to the negative terminal of the battery 55. This current path is supplied by the infiltrating ground water, and the water makes its presence known by establishing a current path and lighting one or more of the lamps 56, 57 and 58.

As shown in the drawings, the disks 37 and 38 are of the same diameter while the disks 39 and 40 are of succeedingly smaller diameters. Water flowing into the sealed off section of the pipe 25 will, therefore, first contact the disks 37 and 38 and make its presence known by lighting lamp 56. As the volume of water in the sealed off section increases it will contact disk 39 to light lamp 57 and then contact disk 40 to light lamp 58. By measuring the time elapsed between the lighting of the several lamps as more fully described hereinafter, the rate of infiltration of the water may be determined. It is also true that as the water level in the pipe 25 increases after the initial contact with disks 37 and 38, and covers more surface area of these disks, the amount of current flowing between the disks will increase, since the resistance to current flow between the electrodes is a function of the volume of water therebetween. The rate of in-flow of water into the sealed off section of pipe 25 may then be roughly determined by the rate of current increase in the circuit as shown by the ammeter 54.

The operation of the device is simple. When a particular stretch of sewage pipe 25 is to be tested for infiltrating leaks, the operators position themselves at the opposite ends of that stretch of pipe in the service entrances or "manholes" and shut off the flow therethrough. The operator at one end of the stretch is equipped with the air hose 36 and the air pressure supply means therefor. The operator at the other end of the pipe is equipped with the apparatus 10. By means of a fish wire or other suitable device, the air hose is threaded through the pipe 25 and coupled to the air pipe 32 on the apparatus 10 and the operator controlling the air hose pulls the apparatus 10 into the sewage pipe 25 to the first testing point. The wheel units 12 support the apparatus 10 for free movement centrally of the pipe 25. When the first testing point is reached, the air hose operator introduces compressed air through the hose 36 and pipe 32 to inflate the balloons 29 and 30 whereby to seal off the section of the pipe 25 to be tested. At this time there should be no appreciable fluid in the pipe 25, though there may be sufficient fluid and residue to establish a contact between the disks 37 and 38. If there is no fluid in the sealed off section, the lamp 56 will be initially darkened. In this case, the operators will wait 2 or 3 minutes to see whether enough water accumulates through infiltration to establish contact between disks 37 and 38 and light lamp 56. If the lamp remains darkened for several minutes, it is clear that no injurious leak is present. If the lamp 38 does light within this time, or is lighted immediately through contact established through moist residue, then the operator will watch the ammeter to see if there is any current increase caused by water rising in the pipe 25. If the current increase is absent, or is very slow, it will be clear that whatever leak exists is so minor as to be negligible. However, if the current increase appears to be rapid enough to bear further investigation, the operation will maintain the apparatus in place and wait for the lamp 57 to light, indicating that the water has reached disk 39. When lamp 57 lights, the operator should begin timing and record the time elapsing between the lighting of lamp 57 and the lighting of the final lamp 58. Having the elapsed time between the lighting of these two lamps and knowing the diameters of the two disks 39 and 40, as well as the diameter of the sewer pipe 25, the distance between the balloons 29 and 30 and the slope, if any, of the pipe 25, the operator may easily calculate the exact rate of in-flow of water in the sealed off section of the pipe 25. It will be understood, of course, that in actual practice, these calculations will be made in advance and provided to the operator in the form of a chart or table so that he may quickly determine the rate of in-flow from investigation of the chart or table.

It should be apparent from the foregoing that my invention provides a simple and efficient means for testing sections of sewage pipe and the like for infiltrating leaks. The wheel units 12 support the pipe 11 at the center of the sewage pipe 25 so that the disks 37–40 are accurately positioned to give proper results. The circular shape of the electrodes 37–40 permits accurate results regardless of how they are oriented in the pipe 24 for the peripheral edges thereof are equally spaced from the supporting pipe 11 at all points. While the circular disk electrodes are to be preferred because of their simplicity, I do not wish to limit the invention to an apparatus having circular electrodes for it is obvious that a similar result could be obtained with electrodes of another type, as for instance pendulum electrodes loosely mounted to the pipe 11 to always depend vertically therefrom. The sealing balloons 29—30 operate efficiently to seal off the section of pipe 25 when inflated, regardless of the presence of residue or roughness of the pipe walls, since they are flexible, and conform to the shape of the pipe 25. The particular detecting and measuring means including the lamps 56–58 and ammeter 54 provide for rapid investigations so that a considerable length of pipe 25 may be tested in a short time.

While I have shown the electrical cable 53 attached to one end of the apparatus 10 and the air hose 36 attached to the other end so that these members may be used to move the apparatus 10 through the pipe 25, it is obvious that both the cable 53 and hose 36 could be provided at the same end to be controlled and operated from the same point. In this instance, other means may be utilized to move the apparatus 10 in the pipe 25.

It is believed that the nature and advantages of my invention appear clearly from the foregoing description.

Having thus described my invention, I claim:

1. A device for detecting and measuring infiltration of water in underground pipes comprising a supporting member, wheel units on said supporting member for supporting the member centrally of the walls of an underground pipe for longitudinal movement therein, spaced apart inflatable sealing members mounted on said supporting member, a fluid supply line connected with said sealing members for supplying inflating fluid thereto, a plurality of spaced apart electrically isolated disks of electrical conductive material mounted on said supporting member and extending outwardly therefrom toward the walls of the underground pipe between the sealing members, electrical conductors connected to said electrode disks, a power source having a high potential terminal and a low potential terminal, one of said conductors being connected to said low potential terminal, another of said conductors being connected to said high potential terminal, and means in one of said conductors to indicate current flow therethrough when a conducting path is established between the disks having conductors connected to said high and low potential terminals.

2. A device for detecting and measuring infiltration of water in underground pipes comprising a supporting member, means on said supporting member for supporting the member in spaced relation to the walls of an underground pipe for longitudinal movement therein, spaced apart inflatable sealing means mounted on the supporting member, a plurality of spaced apart electrically isolated electrodes mounted on said supporting member between the spaced apart sealing means, said electrodes extending outwardly from the supporting means toward the walls of the underground pipe, certain of said electrodes extending outwardly from said supporting means a greater distance than other of said electrodes, electrical conductors connected to said electrodes, a power supply source having a high potential terminal and a low potential terminal, one of said conductors being connected with one of said terminals and the other conductors being connected with the other terminal, and means in certain of said conductors to indicate current flow therethrough when a conducting path is established between electrodes connected to opposite terminals of the power source.

3. A device for detecting and measuring infiltration of water in underground pipes comprising a supporting member, means on said supporting member for supporting the member in spaced relation to the walls of an underground pipe for longitudinal movement therein, spaced apart inflatable sealing means mounted on the supporting member, a plurality of spaced apart electrically isolated electrodes mounted on said supporting member between the spaced apart sealing means, said electrodes extending outwardly from the supporting means toward the walls of the underground pipe, two of said electrodes extending outwardly a greater distance than the remaining electrodes, one of said remaining electrodes extending outwardly a lesser distance than another of said remaining electrodes, electrical conductors connected to said electrodes, a power source having a high potential terminal and a low potential terminal, the conductor connected with one of said farthest outwardly extending electrodes being connected to one of said terminals, the remaining conductors being connected to the other terminal, and means in certain of said conductors to indicate current flow therethrough when a conducting path is established between electrodes connected to opposite terminals of the power source.

4. A device for detecting and measuring infiltration of water in underground pipes comprising a supporting member, means on said supporting member for supporting the member in spaced relation to the walls of an underground pipe for longitudinal movement therein, spaced apart inflatable sealing means mounted on the supporting member, a plurality of spaced apart electrically isolated electrodes mounted on said supporting member between the spaced apart sealing means, said electrodes extending outwardly from the supporting means toward the walls of the underground pipe, two of said electrodes extending outwardly a greater distance than the remaining electrodes, each of said remaining electrodes extending outwardly a different distance than the others, electrical conductors connected to said electrodes, a power source having a high potential terminal and a low potential terminal, the conductor connected with one of said farthest outwardly extending electrodes being connected to one of said terminals, the remaining conductors being connected to the other terminal, and means in certain of said conductors to indicate current flow therethrough when a conducting path is established between electrodes connected to opposite terminals of the power source.

5. A device for detecting and measuring infiltration of water in underground pipes comprising a supporting member, means on said supporting member for supporting the member in spaced relation to the walls of an underground pipe for longitudinal movement therein, spaced apart inflatable sealing members mounted on said supporting member, fluid supply means connected with said sealing members for supplying inflating fluid thereto, a plurality of spaced apart electrically isolated electrodes mounted on said supporting member between the spaced apart sealing members and extending outwardly therefrom toward the walls of the underground pipe, two of said electrodes extending outwardly a greater distance than the remaining electrodes, one of said remaining electrodes extending outwardly a lesser distance than another of said remaining electrodes, electrical conductors connected to said electrodes, a power source having a high potential terminal and a low potential terminal, the conductor connected with one of said farthest outwardly extending electrodes being connected to one of said terminals, the remaining conductors being connected to the other terminal, and means in certain of said conductors to indicate current flow therethrough when a conducting path is established between electrodes connected to opposite terminals of the power source.

6. A device for detecting and measuring infiltration of water in underground pipes comprising a supporting member, means on said supporting member for supporting the member in spaced relation to the walls of an underground pipe for longitudinal movement therein, spaced apart inflatable sealing means mounted on the supporting member, a plurality of spaced apart electrically isolated circular disks of electrical conductive material mounted on said supporting member and extending outwardly therefrom toward the walls of the underground pipe between the spaced apart sealing means, certain of said disks being of larger diameter than other disks, electrical conductors connected to said disks, a power source having a high potential terminal and a low potential terminal, one of said conductors being connected to one of said terminals and the other conductors being connected to the other terminal and means in certain of said conductors to indicate current flow therethrough when a conducting path is established between disks connected to opposite terminals of the power source.

7. A device for detecting and measuring infiltration of water in underground pipes comprising a supporting member, means on said supporting member for supporting the member in spaced relation to the walls of an underground pipe for longitudinal movement therein, spaced apart inflatable sealing means mounted on the supporting member, a plurality of spaced apart electrically isolated circular disks of electrical conductive material mounted on said supporting member and extending outwardly therefrom toward the walls of the underground pipe between the spaced apart sealing means, two of said disks being of larger diameter than the remaining disks, one of the remaining disks being of smaller diameter than another of the remaining disks, electrical conductors connected to said disks, a power source having a high potential terminal and a low potential terminal, the conductor connected to one of said larger diameter disks being connected to one of said terminals, the remaining conductors being connected to the other terminal, and means in certain of the conductors to indicate current flow therethrough when a conducting path is established between disks connected to opposite terminals of the power source.

8. A device for detecting and measuring infiltration of water in underground pipes comprising a supporting member, means on said supporting member for supporting the member in spaced relation to the walls of an underground pipe for longitudinal movement therein, spaced apart inflatable sealing members mounted on said supporting member, fluid supply means connected with said sealing members for supplying inflating fluid thereto, a plurality of spaced apart electrically isolated electrodes mounted on said supporting member between the sealing members and extending outwardly therefrom toward the walls of the underground pipe, two of said disks being of larger diameter than the remaining disks, one of the remaining disks being of smaller diameter than another of the remaining disks, electrical conductors connected to said disks, a power source having a high potential terminal and a low potential terminal, the conductor connected to one of said larger diameter disks being connected to one of said terminals, the remaining conductors being connected to the other terminal, and means in certain of the conductors to indicate current flow therethrough when a conducting path is established between disks connected to opposite terminals of the power source.

9. A device for detecting and measuring infiltration of water in underground pipes comprising a supporting member, means on said supporting member for supporting the member inspaced relation to the walls of an underground pipe for longitudinal movement therein, spaced apart inflatable sealing means mounted on said supporting member, four spaced apart electrically isolated circular disks of electrical conductive material mounted on the supporting member and extending outwardly therefrom toward the walls of the underground pipe between the sealing means, two of said disks being of equal diameter and larger than the remaining disks, one of the remaining disks being of smaller diameter than the other remaining disk, electrical conductors connected to said disks, a power source having two terminals of opposite polarity, the conductor connected to one of said large diameter disks being connected to one terminal, the other three conductors each having a lamp connected therein to indicate current flow therethrough when a current path is established between the disk connected therewith and the disk connected to the opposite terminal of the power source.

10. A device for detecting and measuring infiltration of water in underground pipes comprising a supporting member, means on said supporting member for supporting the member in spaced relation to the walls of an underground pipe for longitudinal movement therein, spaced apart inflatable sealing members mounted on said supporting member, fluid supply means connected with said sealing members for supplying inflating fluid thereto, a plurality of spaced apart electrically isolated electrodes mounted on said supporting member between the sealing members, said electrodes extending from the supporting member outwardly toward the wall of the pipe, certain of said electrodes extending outwardly from the supporting member a greater distance than others, a power supply source having a high potential terminal and a low potential terminal, a current conducting member connecting each electrode to one of said terminals, means connected to the other terminal operable to electrically connect said other terminal to a body of water in the pipe between the sealing means, and current indicating means in said current conducting members operable to indicate current flow therethrough when a conducing path is established between a body of water in the pipe between the sealing means and one or more of said electrodes.

11. A device for detecting and measuring infiltration of water in underground pipes comprising a supporting member, means on the supporting member for supporting it in a pipe in spaced relation to the wall thereof for longitudinal movement therein, spaced apart sealing means on said supporting member operable to seal off a section of pipe therebetween, an electrode mounted on the supporting member between the sealing means, said electrode encircling the supporting member outwardly therefrom toward the wall of the pipe and terminating short of said wall, an electric power source having high and low potential terminals, a current conductor connecting said electrode to one of said terminals, means mounted on the supporting member connected to the other terminal and operable to place said other terminal in electrical connection with a body of water in the pipe between the sealing means, and current indicating means connected to the power source operable to indicate current flow when a conducting path is established between said means and said electrode by contact of water in the pipe between the sealing means.

12. The invention defined in claim 11 wherein the electrode consists of a circular disk concentrically mounted on the supporting member and extending outwardly therefrom.

References Cited in the file of this patent

UNITED STATES PATENTS

| 2,230,137 | Ewertz | Jan. 28, 1951 |
| 2,587,518 | Pearson | Feb. 26, 1952 |
| 2,688,872 | Hartline et al. | Sept. 14, 1954 |